March 20, 1934.  J. J. SANDS  1,951,444
BEET TOPPER
Filed Jan. 11, 1933

Inventor
J. J. Sands
Arthur H. Sturges
Attorney

Patented Mar. 20, 1934

1,951,444

UNITED STATES PATENT OFFICE 1,951,444

BEET TOPPER

John J. Sands, Fremont, Nebr.

Application January 11, 1933, Serial No. 651,204

7 Claims. (Cl. 55—107)

The present invention relates to harvesting machinery and more particularly to an improved construction of beet topper.

An object of the present invention is to provide a new construction of cutter or topping blade which is adapted to move down in between closely located beets, or the like, and to present a substantially horizontal cutting edge to the forward beet for topping the same to simultaneously clear the next adjacent beet or beets.

Another object of the present invention is to provide an improved tread or shoe member disposed in advance of the cutter so as to determine the height and position of the cutter for uniformly topping beets of different heights.

Another object of the present invention is to provide an improved adjusting means between the tread member and the cutter for moving the cutter at a desired ratio with respect to the rise and fall of the tread member in passing over beets and the like, of different sizes.

The invention also aims to provide a beet topper which may be used singly or in multiple in operation upon one or more rows of beets; to provide a beet topper with automatically adjustable means constructed and mounted in a manner to adapt the mechanism to beets of various sizes and to guide the device with respect to the beets so as to bring the cutter in proper position for removing the tops from the beets with a cut of the depth proportionate to the height of the beet.

A further object of the present invention is to provide a beet topper with an endless slat belt which is continuously movable to engage a beet and hold the topper in proper alignment with the beet during the cutting operation.

Another object of the invention is to provide a beet topper with a cutting knife or disc which will move or fall downwardly and backwardly after having severed the top from a beet while the machine is traveling forwardly so that the cutter may be positioned at various proper levels in accordance with the height of the following beets to be topped.

With the foregoing and other objects in view, the invention will be more fully described hereinafter, and will be more particularly pointed out in the claims appended hereto.

In the drawing, wherein like symbols refer to like or corresponding parts throughout the several views.

Figure 1:
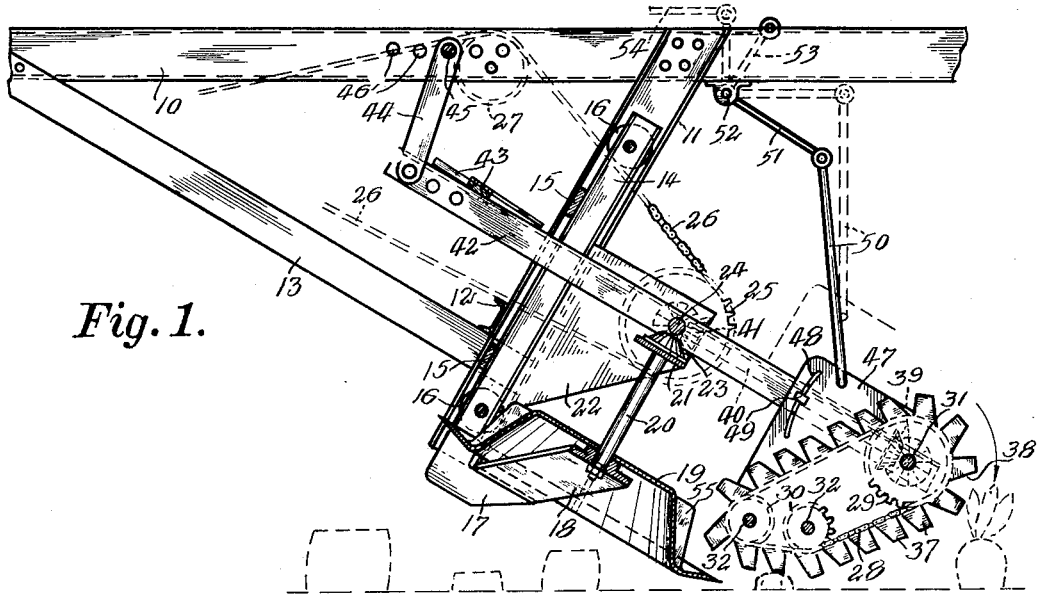
Figure 1 is a longitudinal section taken through a beet topping device constructed in accordance with the present invention, the section being substantially along the line 1—1 of Figure 2.
Figure 2:
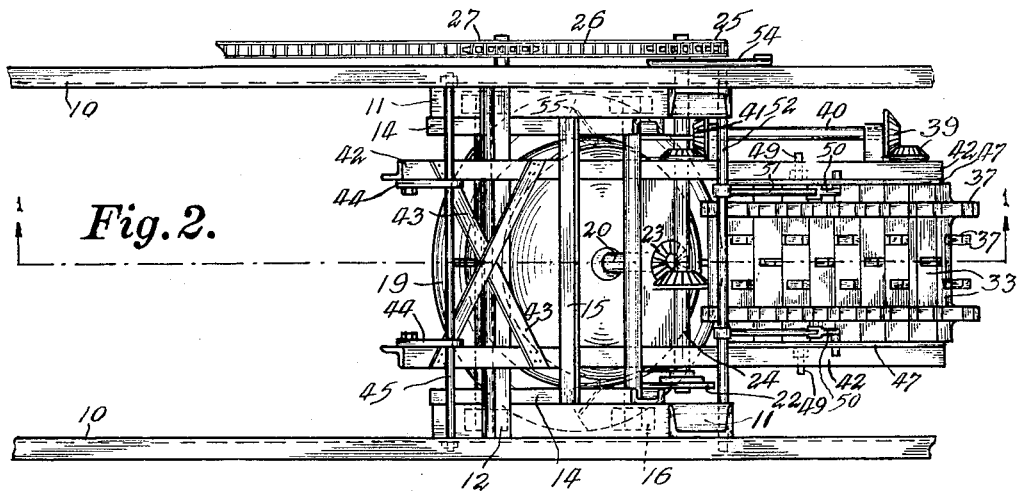
Figure 2 is a fragmentary top plan view of the device.

Referring now to the drawing, the beet topping mechanism or device of the present invention may be mounted upon any suitable carriage or vehicle which may be carried over the ground and suitably guided to pass over the one or more rows of beets to be topped and the mechanism herein may be duplicated as desired for operation upon one or more rows of beets.

The body frame of the device comprises a pair of side bars or rails 10 suitably spaced apart and disposed substantially horizontally, and which carry a pair of downwardly and rearwardly inclined guides 11 which are riveted or otherwise suitably and rigidly secured to the inner opposite sides of the rails 10 and with the guides 11 of channel form with their flanges directed toward each other. The guides 11 are interbraced at their lower ends by a cross piece 12 which may also be of channel form to impart the desired strength to the structure, and may be further braced by means of brace members 13 extending from the lower ends of the guides 11 backwardly and upwardly on frame bars 10, as shown in Figure 1.

The guides 11 carry a movable cutting portion or section which has a movable frame with channel or side bars 14 of less dimensions than the guides 11 and which fit thereinto and are held in spaced apart relation by cross braces 15 which may be riveted, welded or otherwise suitably secured to the side bars 14. The side bars 14 are provided with rollers 16 near their opposite ends and which are of sufficient diameter to engage against the inner walls of the channel guides 11, as shown in Figure 1. The rollers 16 have sufficient clearance within the guide members 11 to admit of the free rise and fall of the guide frame but which prevent the oscillation or free movement of the guiding frame to any appreciable extent upon the guide channels.

The lower ends of the side bars 14 are provided with forwardly extending arms 17 which carry a transverse support 18 in the form of a bar which extends between the arms 17, and which at its intermediate portion is arched upwardly to engage into the concave lower side of a dished guiding disc or member 19. The guiding disc 19 is relatively deep and at its intermediate portion is fixed upon a shaft 20 which at its lower end has bearing in the transverse bar and at its upper end is supported in a cross brace 21 which is secured at opposite ends to wings 22 secured to and projecting forwardly from the side bars 14.

The shaft 20 projects upwardly through the brace 21 and is connected by bevel gears 23 to a drive shaft 24 which has bearing at opposite ends in the wings 22. One end of the shaft 24 carries a sprocket wheel 25 over which is trained a drive chain 26, one portion of which extends upwardly and over a centering and tightening sprocket or pulley 27 mounted upon the adjacent side rail or bar 10. The chain 26 is carried to any suitable source of power which may be mounted upon the vehicle carrying the topping mechanism.

The lower edge of the cutting disc 19 is turned outwardly and sharpened to provide the cutting knife or edge of the disc, and this edge portion constitutes a flange on the disc, and the flange is bent backwardly at an angle greater than a right angle with respect to the axis of the cutter so that when the cutter 19 is disposed in a forwardly and downwardly inclined position, as shown in Figure 1, the cutting edge or flange, at the bottom of the cutter will be disposed substantially in a horizontal position.

Thus, as the machine advances the cutting flange or edge will be presented to the beets to be cut at the desired angle with respect thereto.

Normally, the cutting portion of the topper tends to move by gravity downwardly on the guide channels 11. The cutting portion or section is automatically raised and lowered to adjust the cutting edge to the desired height on the beets to be cut by means of an improved tread member disposed in advance of the cutter and adapted to ride over the beets and to be raised and lowered thereby so as to proportionately raise and lower the cutter.

The tread member comprises an endless belt composed of spaced chains 28 which pass over spaced apart sprocket wheels 29 and 30 mounted on shafts 31 and 32. The shafts 31 and 32 are disposed to lie in substantially a horizontal position but with forward shaft 32 offset downwardly from the general longitudinal plane of the tread member. This arrangement of the shaft disposes a lower rear end portion of the tread member which is relatively short and which approaches a parallel relation with respect to the surface over which the machine passes.

Figure 4:
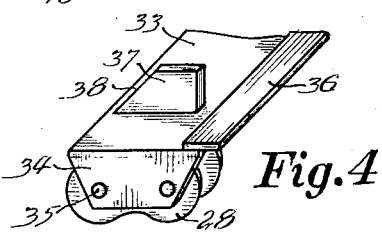
Figure 4 is a detail fragmentary perspective view of a portion of the endless belt or tread member employed.

As shown in detail in Figure 4, the side chains 28 carry between them slats 33 which have downturned flanges 34 at their opposite ends secured by the pivots 35 of the chains 28 to the links thereof.

Cleats or tongues 36 are carried upon one longitudinal edge of each slat in position to overlap the adjacent free edge of the next slat to thus close the endless belt at its joints and prevent the catching of beet tops and the like therein. Each slat 33 is provided with one or more cleats 37 which extend outwardly from the slat and are relatively thin and are provided at their advance edges with inclined faces 38 presenting bevel edges to the cleats for entering the beet tops and digging downwardly therein to engage the top of the beets and to hold the same firmly in position during the cutting action.

The forward shaft 31 of the thread member is connected by bevel gears 39 to align shaft 40 which is connected by bevel gears 41 to the transverse shaft 24, and the tread member is supported upon a pair of arms 42 pivotally mounted intermediate their ends upon the drive shaft 24, the arms adapted to swing vertically at their forward ends during the rise and fall of the tread member in passing over beets of various heights. The arms 42 are secured together to move as a unit by means of a pair of crossed braces 43 which are preferably disposed across the rear end portion of the arms 42.

The arms 42 extend rearwardly and upwardly beyond the channel guides 11 and are pivotally supported upon links 44 having pivot pins 45 at their upper ends adapted to be selectively engaged in a series of openings 46 provided in the side bars 10 so that the pivotal centers or supports of the rear ends of the arms 42 may be changed to meet various conditions of use of the topper.

The rear shafts 32 of the tread member are mounted in side plates 47 which are hinged upon the front shaft 31 and adapted to swing thereabout, the plates 47 being disposed against the inner opposite sides of the arms 42. The plates 47 have arcuate slots 48 therein for receiving clamping bolts 49 carried by the arms 42 for binding the plates 47 in adjusted position. The plates 47 are adapted to raise and lower the rear end of the tread member with reference to the position of the arms 42 and the height of the cutter above the tread member and the surface level of the ground. It will be noted from Figure 1 that the rear end of the tread member is raised slightly with reference to the cutting disc 18 so that the cleats 37 of the tread member may engage the upper portions of the beets as the cutter 19 enters the same and thus holds the beets against displacement from the ground.

A pair of rods 50 is pivotally connected to the plates 47 and extends upwardly therefrom and connected to a pair of bell crank levers 51 mounted on a transverse shaft 52 carried by the frame bars or rails 10. An arm 53 is connected to one end of the shaft 52 and to an operating rod 54 which extends to any suitable point on the machine to control the raising and lowering of the arms 42 and consequently the tread member and the cutter.

It will be understood that the cleats 37 of the tread member may be arranged in any suitable manner at the intermediate portion of the tread member, or offset with respect thereto so that the cleats 37 may engage the tops of the beets and raise the tread member to the desired extent.

The cutter 19 is provided with peripheral outstanding wings 55 adapted to engage the severed tops of the beets and project the same from one side of the machine, depending upon the direction in which the cutter 18 is rotated. Preferably, the severed beet tops are thrown over upon the adjacent rows of topped beets.

In operation, the machine is carried forwardly over a row of beets. The tread member is continuously operated at preferably a speed in excess of the rate of travel of the machine. The cutting disc 19 is simultaneously revolved.

Figure 3:
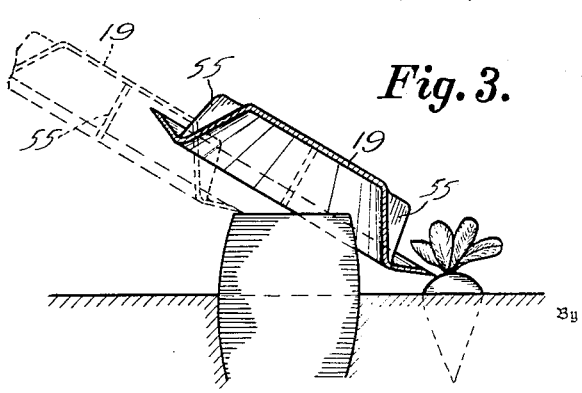
Figure 3 is a diagrammatic illustration of the operation of the cutting knife or disc employed.

When the tread member engages a beet top, the cleats 37 embed themselves in the top of the beet and engage the body of the beet so as to support the tread member, and as the machine moves forwardly the tread member is raised through a distance depending upon the height of the beet so that the arms are swung upwardly at their forward ends about the lower ends of the links 44. The links 44 are adjusted at their upper ends in a selected opening 46 so as to raise and lower the rear ends of the arms 42 and thus determine the desired position of elevation of the cutting disc 19 above the surface level of the ground. As the tread member is raised in passing over a beet, the arms 42 raise the drive shaft 24 therewith and, through the wings 22, slide the cutting section or frame upwardly in the channel guides 11 so as to correspondingly raise and lower the edge of the cutter 19 above the ground to register the cutter correctly with the top portion of the beet. As shown to advantage in Figure 3, the cutter 19 is dished at its under side so that the cutter may drop down into proper register with a relatively low beet after the cutter has passed into position over a relatively large beet.

This construction and arrangement therefore admits of the quick and fine adjustment of the cutter 19. Of course, the side plates 47 of the tread member are adjusted so as to dispose the rear end of the tread member at the desired distance above the ground and above the horizontal plane of the cutting disc 19 when in normal position.

When it is desired to transport the device from one place to another without using the beet topping mechanism, the links 50 are raised so as to draw the tread member upwardly and to swing the arms 42 therewith and thus raise the cutter 18 clear of all obstructions on the ground.

It will be noted from Figure 1, particularly, that as the tread member is mounted on the outer ends of the arms 42, and the cutter 19 is carried by the cutting frame, the radius of the tread member from the links 44 is greater than the radius of the cutter 19 from the links so that the cutter will be moved through a proportionately less distance than the tread member. This is for the purpose of insuring the cutting of a top from a beet which is proportionate to the size of the beet because where the beets are relatively tall the roots of the beet tops are relatively deeper and consequently the cut must be proportionately lower than the top of the beet. There is therefore a differential but proportionate movement between the tread member and the disc.

As the machine travels forwardly the beet contacts with the cleats 37 of the endless belt and the latter engages the foliage upon the beet and either removes the foliage or bends it down solidly whereby the weight of the mechanism will be supported while the knife 19 is operating on a beet. In other words, assuming that the knife 19 is half way through a beet, were it not for the lugs 37 the weight of the mechanism would be supported by the knife in contact with the beet whereby the knife instead of cutting the beet clean would, after the knife had entered the beet a slight way, break the balance of the top off. Sugar beets are breakable similar to a carrot. Since the weight is carried on the lugs 37 the knife 19 is permitted to sever the beet smoothly, making a horizontal cut and without breaking off a portion of the beet top.

Another function of the beet engaging cleats 37 is to brace the beet while the knife is traveling forward and press the beet in an opposite direction while cutting it. In other words, some of the beets are loose in the ground and the knife could push them over instead of cutting through them. But because the beet engaging cleats 37 move rearwardly towards the knife they cause the beet to be either held solid or move it towards the knife so that the knife can perform a proper severing operation.

The beet engaging cleats 37 are provided with the inclined edges 38 to facilitate the initial sliding of the cleat on top of the beet whereby the cleats get down to the beet namely, the top of the beet instead of the foliage thereof.

In Figure 1, a sugar beet is shown in dotted lines, and it will be noted that the beet engaging cleats 37 rest upon the top thereof and carry the weight of the movable parts. It will be further noted that as the machine travels forwardly the particular cleat engaging with the beet, as shown in Figure 1, will move away from the beet but that the next succeeding cleat will engage the beet before the first cleat has completely left it, thus supporting the weight of the mechanism. At this time the nut on the bolt 49 has been tightened so that the belt and arms 42 will be caused to move upwardly at times when the bushings first engage a beet.

It is obvious that various changes and modifications may be made in the details of construction and design of the above specifically described embodiment of this invention without departing from the spirit thereof, such changes and modifications being restricted only by the scope of the following claims.

What is claimed is:

1. In a beet topping device, a support, vertical guide rails carried by the support, a guiding frame slidably mounted on the guide rails, a cutter mounted on the lower end of the same for topping beets, a pivoted device mounted on the cutting frame above the cutter and extending forwardly and rearwardly of the frame, a tread member mounted on the forward end of the pivoted device, and adjustable means for connecting the rear end of the pivotal device to said support.

2. In a beet cutting device, a support, downwardly and rearwardly extending guide rails mounted on the support, a cutting frame movably mounted on the guide rails, a cutter mounted on the lower end of said frame, a pair of arms pivotally mounted at their rear ends upon the support and pivotally connected intermediate their ends upon said cutter frame, and a tread member mounted on the forward ends of said arms.

3. In a beet topping device, a support, guide means mounted on the support, a cutter mounted on the guide means adapted for vertical adjustment, arms pivotally connected at their rear ends to the support and at their intermediate portions to said cutter, a tread member adjustably mounted upon the forward end of the arms and adapted to be raised and lowered at its lower end relatively to the arms.

4. In a beet topping device, a support, a substantially vertical guide mounted on the support, a cutter frame mounted for vertical movement on the guide, a cutter mounted on the lower end of the frame, an arm pivotally mounted intermediate its ends on the frame, an adjustable link between the rear end of said arm and said support, and a tread member adjustably mounted on the forward end of the arm for adjustment relatively to the cutter.

5. In a beet topping device, a pair of supporting rails, a pair of oppositely facing channel guides mounted on said rails and extending downwardly and rearwardly therefrom, a frame mounted in said guide rails, anti-friction rollers carried by the frames for engaging the guide rails and admitting the rise and fall of the frame therein, a disc cutter mounted on the lower end of the frame and being dished at its under side, a shaft carried by the frame and connected to the disc for rotating the same, a transverse shaft mounted on the frame connected to the first shaft for driving the latter, a pair of arms pivoted intermediate their ends upon the transverse shaft, an endless tread member mounted between the forward ends of said arms and connected to said transverse shaft for driving the tread member, and a pair of links pivotally mounted upon the rear ends of the arms beyond said frame and adjustably pivoted to said support whereby rise and fall of the tread member raises and lowers the cutting disc proportionately to the movement of the tread member.

6. In a beet topping device, a support, guide means extending downwardly from the support, a frame mounted on the guide means, a disc cutter mounted on the frame, a pair of arms pivotally connected intermediate their ends upon the frame, links connected between the rear ends of said arms and said supports, a tread member mounted on the forward ends of said arms for passage over beets to raise and lower the forward ends of the arms and the frame and cutter, and manually operable means for elevating said tread member out of contact with beets and for raising said cutter out of line therewith.

7. In a beet topping device, a rotary cutter comprising a disc dished out at its under side and having an annular cutting flange at its lower edge adapted to engage the tops of beets, and an intermediate portion of the cutter adapted to engage downwardly over prior topped beets to permit adjustment of the cutter where the beets are relatively close together, said cutter having peripheral outstanding wings to engage the severed tops of the beets and project the same from one side of the machine.

JOHN J. SANDS.